United States Patent [19]

Etheridge

[11] Patent Number: 4,894,986
[45] Date of Patent: Jan. 23, 1990

[54] BIPROPELLANT ROCKET ENGINES

[75] Inventor: Colin J. Etheridge, Buckingham, England

[73] Assignee: Royal Ordnance, London, England

[21] Appl. No.: 343,444

[22] Filed: Apr. 26, 1989

[30] Foreign Application Priority Data

May 11, 1988 [GB] United Kingdom ............... 8811126

[51] Int. Cl.⁴ ............................................... F02K 9/52
[52] U.S. Cl. ........................................ 60/258; 60/259; 60/260
[58] Field of Search ................. 60/258, 257, 259, 260, 60/748

[56] References Cited

U.S. PATENT DOCUMENTS

| 2,667,740 | 2/1954 | Goddard | 60/258 |
| 3,040,520 | 6/1962 | Rae | 60/260 |
| 3,257,799 | 6/1966 | Goalwin | 60/259 |
| 3,516,251 | 6/1970 | Andrews et al. | 60/258 |
| 3,534,909 | 10/1970 | Paine | 60/258 |
| 4,771,599 | 9/1988 | Brown et al. | 60/259 |

FOREIGN PATENT DOCUMENTS

| 3328117 | 2/1985 | Fed. Rep. of Germany | 60/259 |
| 853495 | 11/1960 | United Kingdom | 60/258 |

OTHER PUBLICATIONS

Alexander, "P & W Designs Extendible Skirt for RL20 Rocket Engine", *Aviation Week & Space Technology*, Sep. 19, 1966, pp. 60–63.

Primary Examiner—Donald E. Stout
Attorney, Agent, or Firm—Nixon & Vanderhye

[57] ABSTRACT

A construction for the delivery of propellant constituents to the main combustion chamber of a hypergolic liquid bipropellant rocket engine having a staged combustion cycle incorporating at least one precombustor comprises: a mixer for mixing together prior to delivery to the main combustion chamber a first propellant constituent comprising oxidant together with exhaust gas from the precombustor injector means for injecting the mixture of the oxidant and exhaust gas provided by the mixer into the main combustion chamber in such a manner that the injected mixture forms a recirculation zone inside the main combustion chamber, an inlet into the main combustion chamber for a second propellant constituent comprising fuel, and a delivery channel to the said inlet, the said inlet and delivery channel being disposed laterally of the injector means relative to the main direction of flow through the injector means in such a position that fuel delivered into the main combustion chamber thereby is delivered into the said recirculation zones.

10 Claims, 4 Drawing Sheets

BIPROPELLANT ROCKET ENGINES

The present invention relates to bipropellant rocket engines and more particularly to constructions for the delivery of liquid propellant constituents to the main combustion chamber of such engines. The invention is applicable to the class of such engines in which the propellant comprises hypergolic constituents (ie. constituents which spontaneously ignite when they come into contact) and in which a staged combustion cycle is provided, the propellant constituents being reacted together in at least one precombustor to provide pump energy for the engine, prior to combustion in the main combustion chamber.

According to the present invention a construction for the delivery of propellant constituents to the main combustion chamber of a hypergolic liquid bipropellant rocket engine having a staged combustion cycle incorporating at least one precombustor comprises a mixer for mixing together prior to delivery to the main combustion chamber a first propellant constituent comprising oxidant together with exhaust gas from the precombustor, injector means for injecting the mixture of the oxidant and exhaust gas provided by the mixer into the main combustion chamber in such a manner that the injected mixture forms a recirculation zone inside the main combustion chamber, an inlet into the main combustion chamber for a second propellant constituent comprising fuel, and a delivery channel for delivering fuel into the mean combustion chamber through the said inlet, the said inlet and delivery channel being disposed laterally of the injector means relative to the main direction of flow through the injector means in such a position that fuel delivered into the main combustion chamber thereby is delivered into the said recirculation zones.

Preferably the construction also includes an insulator arranged to insulate the said inlet and delivery channel thereto from the injector means whereby fuel delivered through the said inlet is insulated, prior to delivery into the main combustion chamber, from the hot mixture of exhaust gas and oxidant injected by the injector means into the chamber.

The injector means may comprise a passage leading from the mixer to the main combustion chamber in which is provided a pintle, the head of which extends into the chamber, providing a laterally facing ring-shaped gap between the end of the passage and the chamber by which the oxidant/exhaust gas mixture is injected radially into the chamber in a multiplicity of radially diverging directions close to the surface of the end wall of the chamber thereby forming a recirculation zone in the chamber adjacent to the end wall, the said inlet for the fuel being provided laterally in the end wall.

Alternatively, the injector means may comprise a passage leading from the mixer in which is provided a swirler construction, which is a construction having static blades arranged to deflect the oxidant/exhaust gas mixture radially into the main combustion chamber close to the end wall of the chamber, thereby to form a recirculation zone into which the fuel is delivered. Suitable swirler constructions are known per se.

The mixer may comprise a chamber into which the exhaust gas is delivered via a first delivery channel and a second delivery channel terminating inside the chamber via which oxidant is delivered. The second delivery channel may comprise a pipe having an open end; or it may have a closed end, delivery into the chamber being through lateral nozzles in the pipe.

The oxidant stream delivered to the mixer may be liquid or gaseous. The mixture with the exhaust gas may comprise a homogeneous gas or a gas containing liquid droplets, depending on the mixer configuration.

The degree of mixing between the hot exhaust gas and the cooler oxidant may be controlled whereby surfaces of the injector means may be cooled. In the case where the injector means includes a pintle, the rear surface of the pintle (relative to the front surface extending into the main combustion chamber) may conveniently be cooled in this way.

The propellant constituents used may be known. For example, the oxidant may be selected from nitrogen tetroxide ($N_2O_4$) and MON-3 ($N_2O_4$ plus 3 percentby volume of other nitrogen oxides) and the fuel may be selected from one or more of hydrazine, monomethyl hydrazine or a dimethyl hydrazine eg. UDMH (unsymmetrical dimethyl hydrazine).

The insulator may comprise a sleeve of conventional insulating material such as a ceramic material.

The inlet for the fuel may comprise an annular opening in the end wall of the main combustion chamber disposed around the injector means, but separated therefrom by the insulator. Alternatively, the inlet may comprise a series of discrete nozzles disposed in a circular fashion around the injector means.

Preferably, the inlet for the fuel is arranged to deliver fuel along the side wall of the main combustion chamber thereby providing cooling of that wall.

The construction according to the present invention has the following benefits: (1) fuel is isolated from the oxidant by an insulating barrier and is prevented from decomposing prior to delivery to the main combustion chamber; (2) the injection arrangement is simplified by the use of the mixer to mix together oxidant and exhaust gas streams prior to injection into the main combustion chamber; and (3) the formation of the oxidant/exhaust gas mixture in recirculation zones into which the fuel is delivered provides high efficiency mixing of the fuel with the oxidant/exhaust gas mixture; and (4) delivery of the fuel adjacent to the side wall of the main combustion chamber provides cooling of that wall.

Embodiments of the present invention will not be described by way of example with reference to the accompanying drawings, in which.

Figure 1:
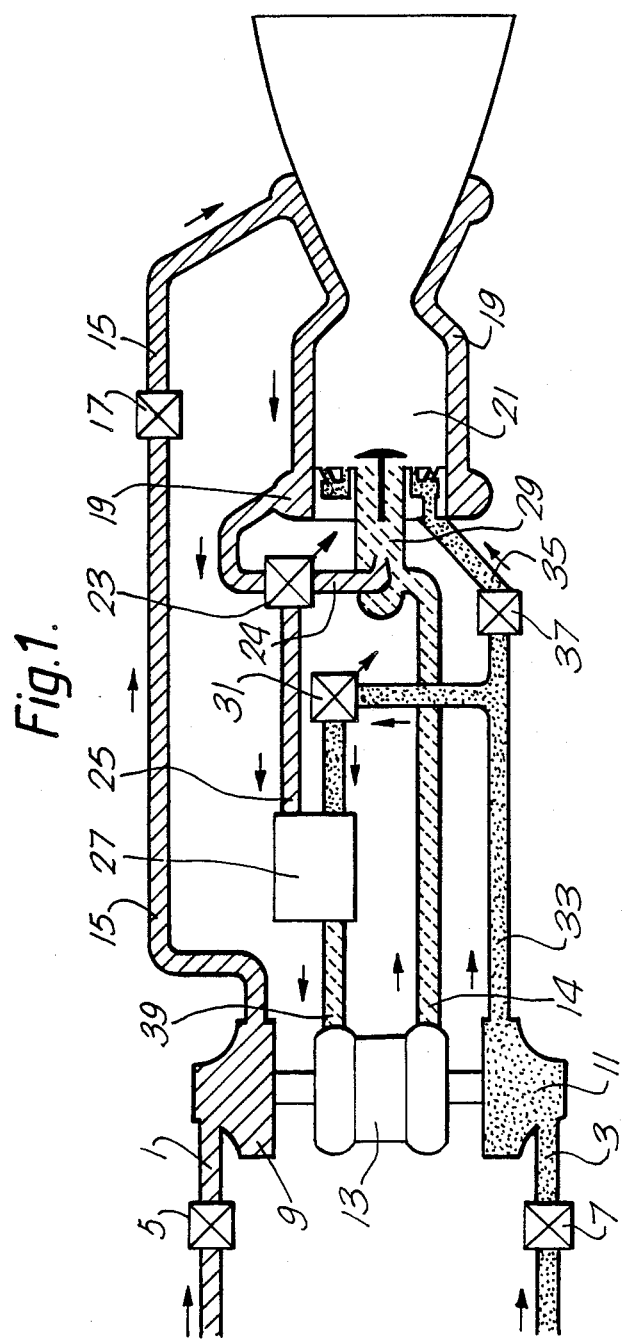
FIG. 1 is a schematic cross-sectional view of a precombustion and fuel delivery arrangement of a liquid bipropellant rocket engine.

In the arrangement shown in FIG. 1, liquid oxidant, eg MON-3, and liquid fuel, eg. MMH, are delivered from tanks (not shown) respectively along delivery channels 1, 3 respectively via valves 5,7 to pumps 9,11 typically at at temperature of 298 K. and a pressure of 5 bar. The pumps 9,11 are driven by a turbo-generator 13. Oxidant from the pump 9 is pumped via a channel 15 including a valve 17 to a jacket 19, where it provides regenerative cooling of a main rocket engine chamber (thrust chamber) 21. Oxidant from the jacket 19 is passed through a two-outlet valve 23 from which it is delivered to a precombustor 27 via a channel 25 and also to a mixer 29.

Fuel from the pump 11 is delivered via a channel 33 including a valve 31 to the precombustor 27 and also direct to the chamber 21 via a channel 3 including a valve 37.

Oxidant and fuel are reacted together in the precombustor 27. Exhaust gas from the precombustor 27 is supplied via a channel 39 to drive the generator 13 and is also supplied to the mixer 29 via a channel 41.

Oxidant supplied to the mixer 29 typically has a pressure of 217 bar and a temperature of 377 K. Exhaust gas supplied to the mixer 29 typically has a pressure of 105 bar and a temperature of 831 K. Fuel delivered to the chamber 21 typically has a pressure of 105 bar and a temperature of 298 K.

Figure 2:
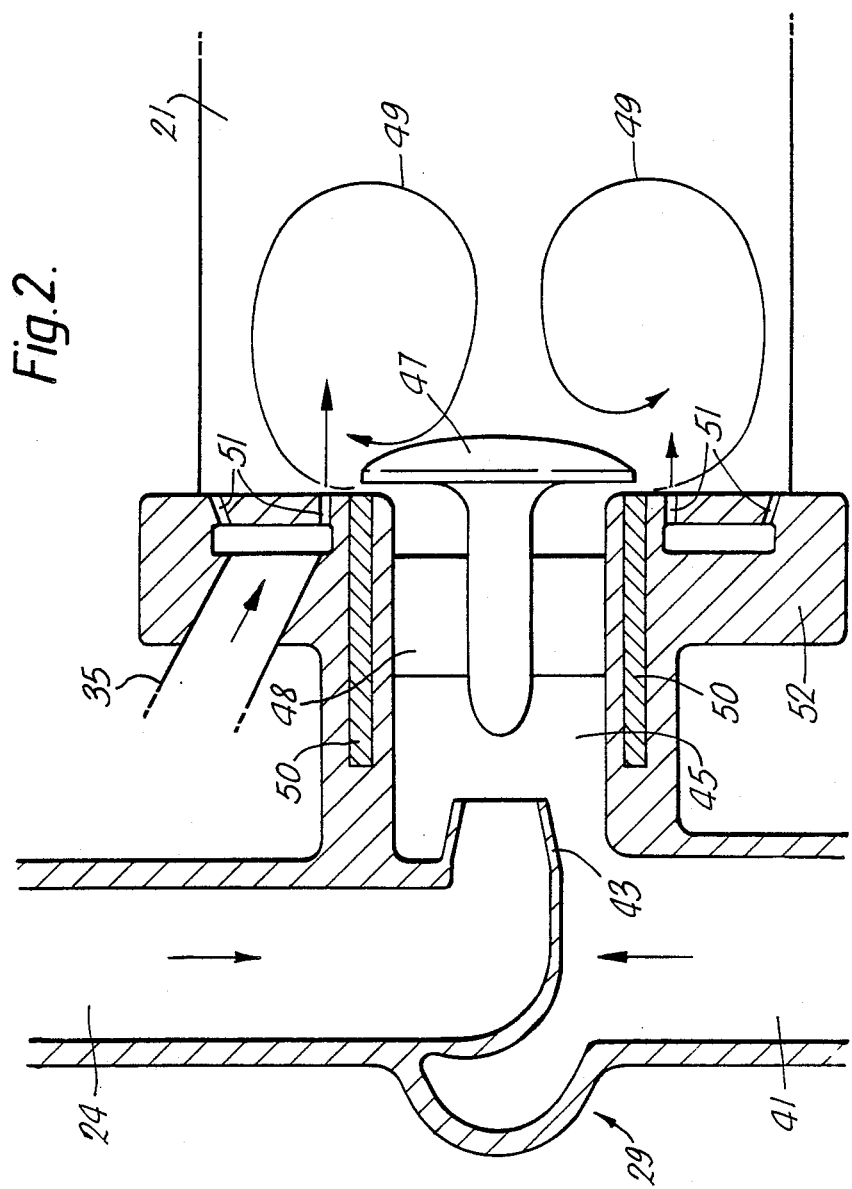
FIG. 2 is a cross-sectional side view of the propellant injection construction included in the arrangement shown in FIG. 1.

The mixer 29 forms part of an injector arrangement for the chamber 21 and the arrangement is shown in more detail in FIG. 2.

In FIG. 2 the mixer 29 which provides mixing of oxidant delivered along the channel 24 and exhaust gas delivered along the channel 41 is shown as an inner pipe 43 opening into a chamber 45 formed as an extension of the channel 41. The oxidant/exhaust gas mixture is fed into the rocket combustion chamber 21 through the ring shaped gap formed between the head of a pintle 47 and the end of chamber 45 adjacent to the chamber 21. The head of the pintle 47 protrudes into the chamber 45. The pintle 47 which is supported by a structure of vanes 48 causes the oxidant/exhaust mixture to be injected into the chamber 21 in recirculation jets to form a recirculation zone as indicated in FIG. 2 by the curved arrows 49. As noted with reference to FIG. 1 above, fuel is delivered to the chamber 21 along the channel 35 and is injected as an annular sheet into the chamber via an annular inlet port 51. The port 51 is located in an end wall 52 of the chamber 21 around the pintle 47. In the chamber 21 the fuel enters the recirculation zone of the oxidant/exhaust mixture and combustion of the fuel in the mixture takes place to drive the rocket engine in a conventional manner.

Fuel delivered to the chamber 21 is insulated from the hot mixture in the chamber 45 by an insulating sleeve 50.

Figure 3:
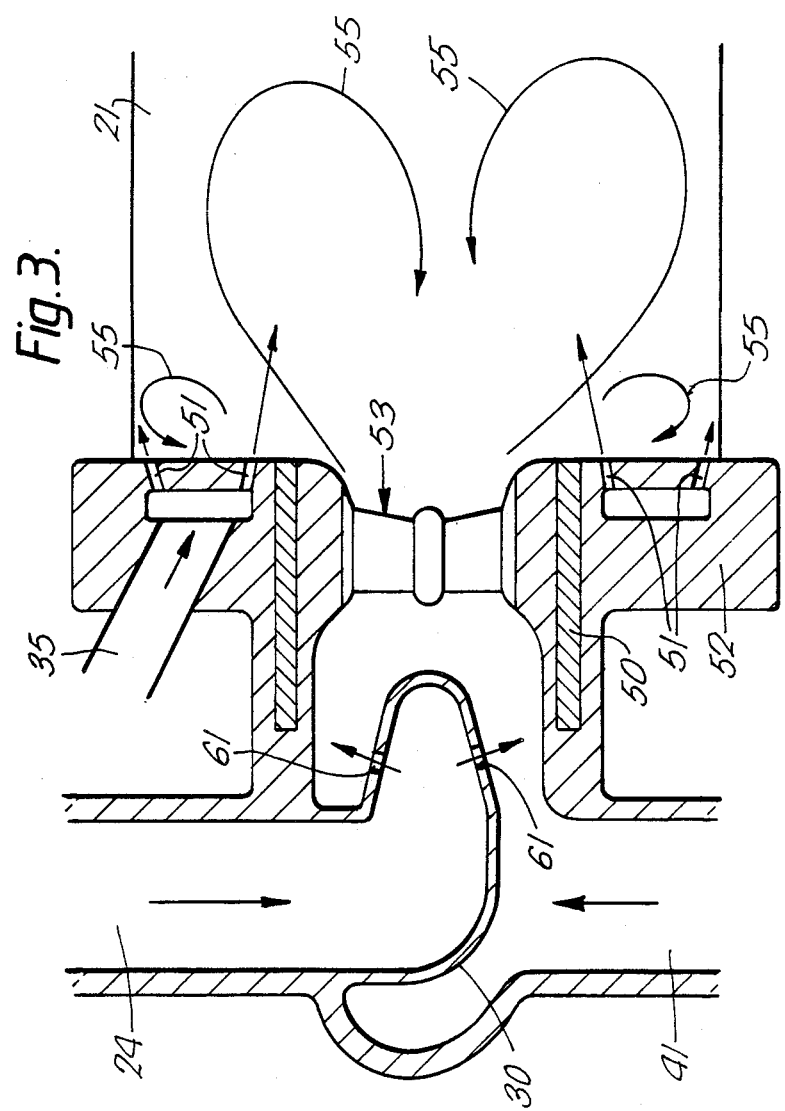
FIG. 3 is a cross-sectional side view of an alternative form of injection construction suitable for the arrangement shown in FIG. 1.

In the alternative arrangement shown in FIG. 3, the mixer 29 is formed from a closed pipe 30 which terminates inside a chamber 45 formed from the extension of the channel 41, the pipe having lateral nozzle outlets 61. The pintle 47 of FIG. 2 is replaced in this case by a static swirler 53 which provides recirculation zones (indicated by curved arrows 55) of the exhaust/oxidant mixture in the chamber 21 by deflection of the mixture of oxidant/exhaust has injected into the chamber 21 in a multiplicity of lateral directions relative to the axis of the swirler 53. Fuel is delivered into the chamber 21 in the same manner as shown in FIG. 2 and is again insulated from the hot mixture in the chamber 45 by an insulating sleeve 50.

Figure 4:
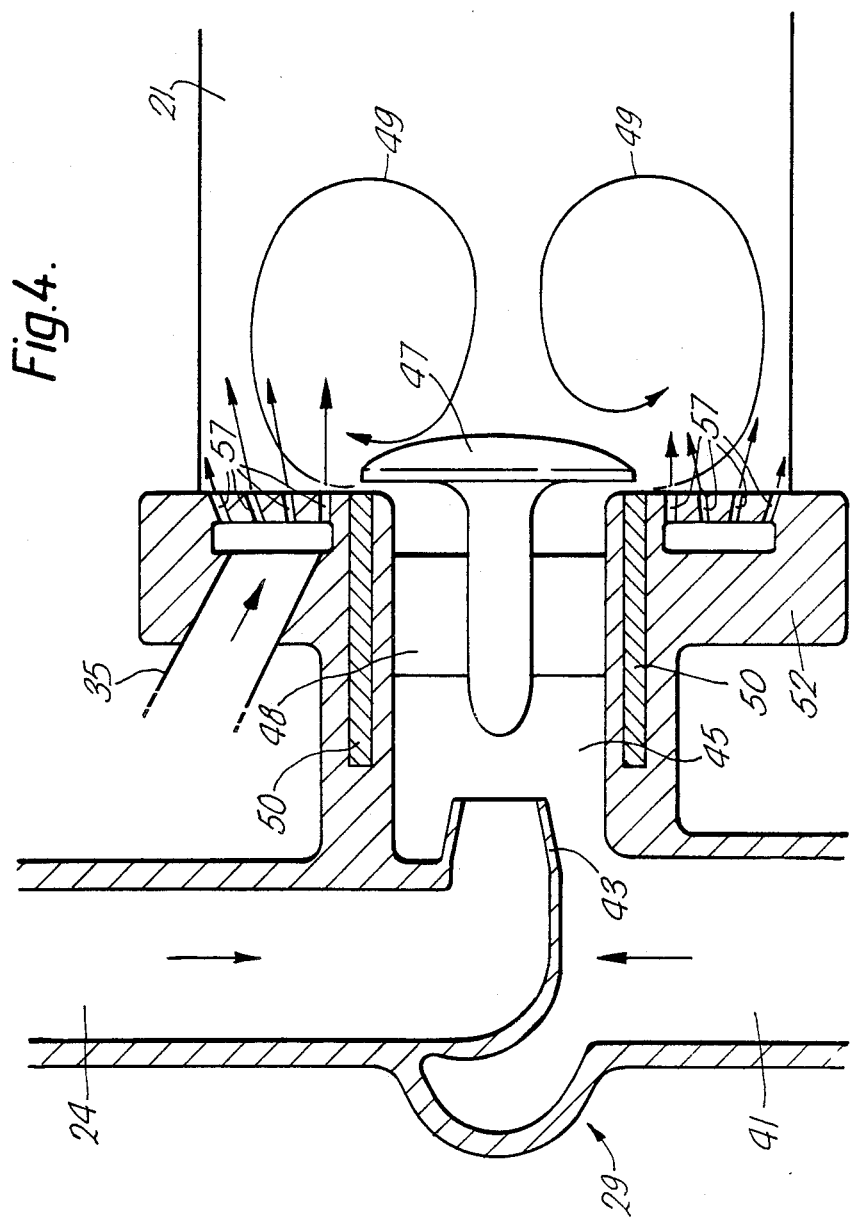
FIG. 4 is a cross-sectional side view of a further alternative injection construction suitable for use in the arrangement shown in FIG. 1.

In a further alternative embodiment of the invention as shown in FIG. 4, the annular inlet port 51 of FIG. 2 is replaced by a series of discrete jets 57, disposed in an annular fashion around the insulating sleeve 50.

In further alternative embodiments of the invention (not shown) the injector construction may comprise a pintle as shown in FIG. 2, together with a mixer 29 in the form shown in FIG. 3 or a swirler as shown in FIG. 3 together with a mixer 29 in the form shown in FIG. 2.

I claim:

1. A construction for the delivery of propellant constituents to the main combustion chamber of a hypergolic liquid bipropellant rocket engine having a staged combustion cycle incorporating at least one precombustor comprising a mixer for mixing together prior to delivery to the main combustion chamber a first propellant constituent comprising oxidant together with exhaust gas from the precombustor, injector means for injecting the mixture of the oxidant and exhaust gas provided by the mixer into the main combustion chamber in such a manner that the injected mixture forms a recirculation zone inside the main combustion chamber, an inlet into the main combustion chamber for a second propellant constituent comprising fuel, and a delivery channel to the said inlet, the said inlet and delivery channel being disposed laterally of the injector means relative to the main direction of flow through the injector means in such a position that fuel delivered into the main combustion chamber thereby is delivered into the said recirculation zones.

2. A construction as claimed in claim 1 and which also includes an insulator arranged to insulate the said inlet and delivery channel thereto from the injector means whereby fuel delivered through the said inlet is insulated, prior to delivery into the main combustion chamber, from the hot mixture exhaust gas and oxidant injected by the injector means into the chamber.

3. A construction as claimed in claim 1 and wherein the injector means comprises a passage leading from the mixer to the main combustion chamber in which is provided a pintle, the head of which extends into the chamber, providing a laterally facing ring shaped gap between the end of the passage and the chamber by which the oxidant/exhaust gas mixture is injected radially into the chamber in a multiplicity of radially diverging directions close to the surface of the end wall of the chamber thereby forming a recirculation zone in a chamber adjacent to the end wall, the said inlet for the fuel being provided laterally in the end wall.

4. A construction as claimed in claim 1 and wherein the injector means comprises a passage leading from the mixer in which is provided a swirler construction having static blades arranged to deflect the oxidant/exhaust gas mixture radially into the main combustion chamber close to the end wall of the chamber, thereby to form a recirculation zone into which the fuel is delivered.

5. A construction as claimed in claim 1 and wherein the mixer comprises a chamber into which the exhaust has is delivered via a first delivery channel and a second delivery channel terminating inside the chamber via which oxidant is delivered.

6. A construction as claimed in claim 5 and wherein the second delivery channel comprises a pipe having an open end.

7. A construction as claimed in claim 5 and wherein the second delivery channel has a closed end, delivery into the chamber being through lateral nozzles in the pipe.

8. A construction as claimed in claim 1 and wherein the inlet for the fuel comprises an annular opening in the end wall of the main combustion chamber disposed around the injector means, but separated therefrom by an insulator.

9. A construction as claimed in claim 1 and wherein the inlet comprises a series of discrete nozzles disposed in a circular fashion around the injector.

10. A construction as claimed in claim 1 and wherein the inlet for the fuel is arranged to deliver fuel along the side wall of the main combustion chamber thereby providing cooling of that wall.

* * * * *